April 18, 1961

A. D. PINOTTI 2,979,864

APPARATUS AND METHOD FOR PRODUCING GLASS TUBING

Filed May 21, 1957

INVENTOR
ALFRED D. PINOTTI
BY W. A. SCHAICH &
LEONARD D. SOBIER
ATTORNEYS

April 18, 1961 A. D. PINOTTI 2,979,864
APPARATUS AND METHOD FOR PRODUCING GLASS TUBING
Filed May 21, 1957 2 Sheets-Sheet 2

INVENTOR
ALFRED D. PINOTTI
BY W. A. SCHAICH &
LEONARD D. SOUBIER
ATTORNEYS

United States Patent Office 2,979,864
Patented Apr. 18, 1961

2,979,864

APPARATUS AND METHOD FOR PRODUCING GLASS TUBING

Alfred D. Pinotti, Toledo, Ohio, assignor to Kimble Glass Company, a corporation of Ohio Filed May 21, 1957, Ser. No. 660,607

10 Claims. (Cl. 49—17.1)

The present invention relates to improvements in both apparatus and method for producing glass tubing and is especially adapted for use in conjunction with apparatus such as that disclosed in U.S. Patent No. 1,219,709 to Danner, issued March 20, 1917, entitled "Apparatus for Forming Molten Material in Cylindrical Form." In such apparatus a supply stream of molten glass flows onto a rotating inclined tapered mandrel and a hollow tube or cylinder is continuously drawn from the lower end of the mandrel. A substantial part of the mandrel as well as the supply stream and glass surrounding a major part of the mandrel are enclosed in the heated chamber.

Where certain types of glass are being used, borosilicate, for example, it has been discovered that there is substantial surface volatilization of boron and alkalimetal constituents from the glass which results in an exposed silica-rich surface on the formed glass tube. The loss of these more volatile components produces incipient devitrification which manifests itself as a visible "surface smear." This type of defect usually occurs more frequently on the inner surfaces of tubing although it may similarly occur on the exterior of tubing or rod. Tubular products which are produced with such defects are not marketable as quality ware, if at all.

A general object of this invention is to overcome the above noted deficiency as well as others resulting from volatilization losses, and to that end, an alkali metal and boron containing compound is introduced into the tube forming chamber or muffle in such amounts as to cause the atmosphere surrounding the glass supply stream and initially formed glass on the mandrel to become saturated with boron and alkali metal oxides. As a consequence, this saturated atmosphere prevents or in any event materially reduces loss of the identified components at the glass surface and thereby eliminates the defects described above.

Another object of this invention is the provision of simple and efficient means for introducing alkali metal and boron oxides in volatile form from borax or an equivalent material into the chamber or muffle which encloses the forming mandrel.

A further object of this invention is the provision of novel apparatus for regulatably controlling the quantity of volatilized material to counteract volatilization losses from the glass by introducing boron and alkali metal oxides into the forming chamber at prescribed rates to thereby control the forming atmosphere.

A still further object of this invention is to provide both novel apparatus and method for delivering boron and alkali metal oxides in volatilized form and in regulatable amounts to the chamber or muffle to primarily eliminate surface defects of glass being continuously drawn in the form of cane or tubing.

The specific nature of this invention, as well as other objects and advantages thereof, will become apparent to those skilled in the are from the following detailed description, taken in conjunction with the annexed sheet of drawings on which, by way of preferred example only, are illustrated the preferred embodiments of this invention.

Figure 1:
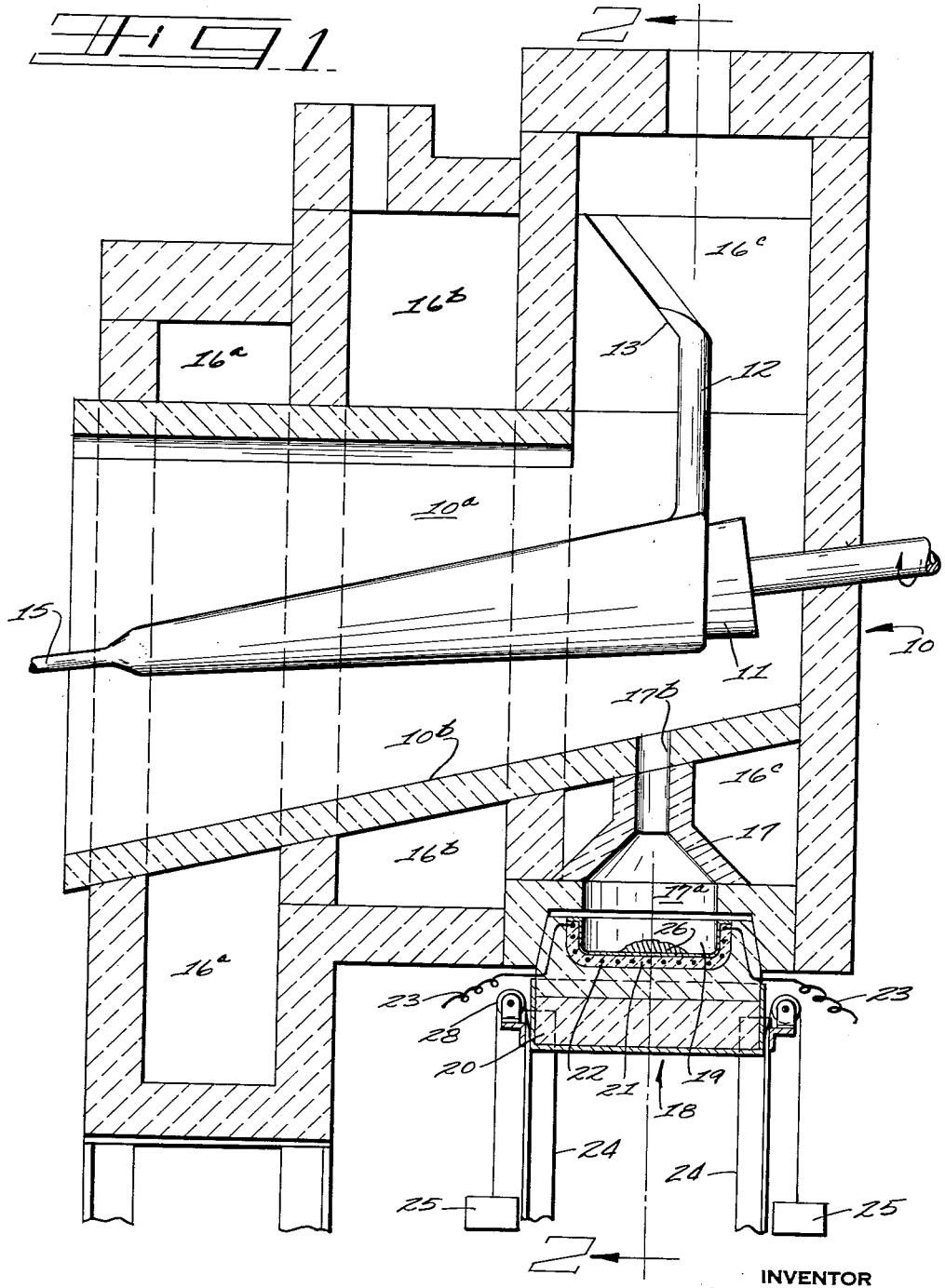
Fig. 1 is an enlarged sectional view illustrating the present invention in one form incorporated in conventional glass tube drawing apparatus.
Figure 2:
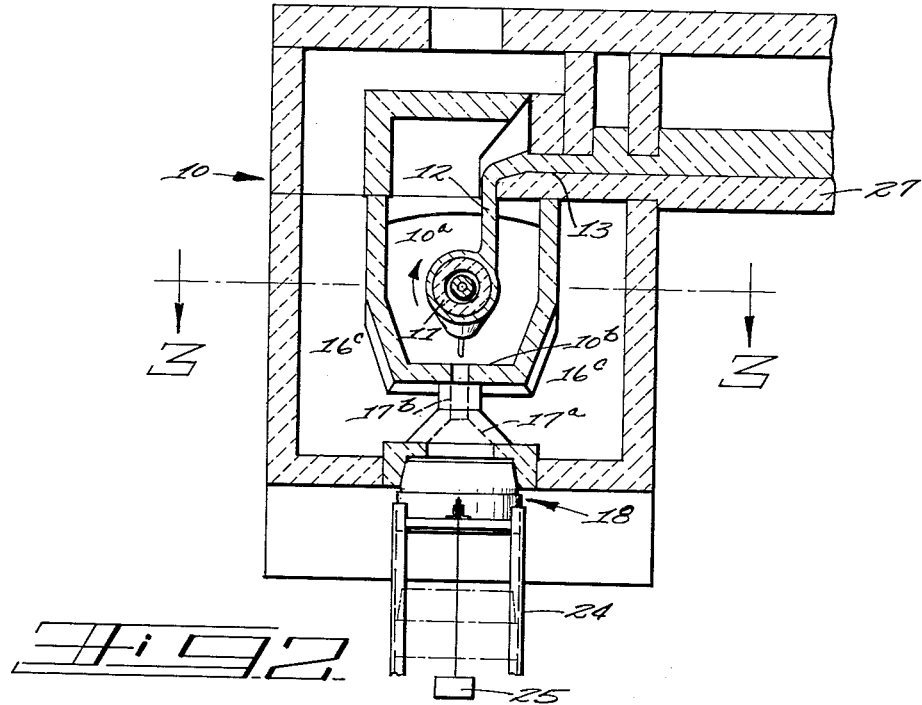
Fig. 2 is a vertical sectional view of reduced proportions taken along the line 2—2 of Fig. 1.
Figure 3:
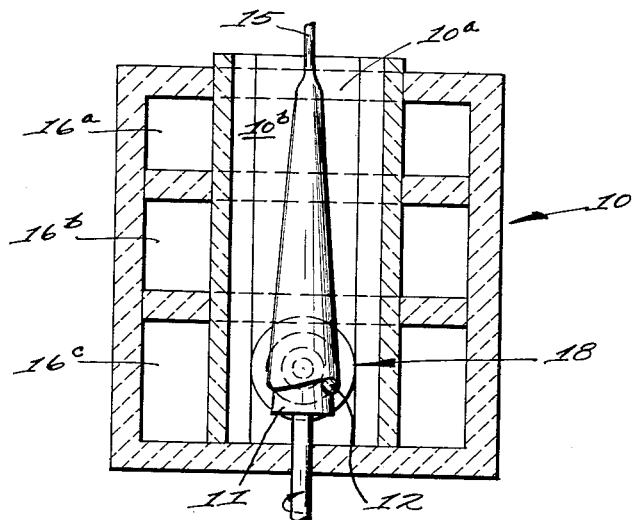
Fig. 3 is a horizontal sectional view taken along the line 3—3 of Fig. 2.

The present invention is particularly well adapted for use in connection with the apparatus of the above identified patent and the drawings indicate a preferred form of incorporating novel apparatus therein to accomplish the purposes set forth above. A muffle or chamber 10 encloses the usual rotating mandrel 11 upon the outer surface of which molten glass flows, delivered thereto in the form of a supply stream 12 from a delivery trough 13 at the end of a forehearth 27. The above described elements may be varied widely as known in the art and may or may not be of relatively conventional structure.

The glass stream 12 is continuously deposited on rotating mandrel 11 and smoothly flows over the mandrel surfaces in a frusto-conical pattern. The glass is drawn therefrom at prescribed rates into cylindrical form 15 comprising tube or rod. Forming chamber or muffle 10 which may be either fabricated of or lined with refractory material is surrounded by a plurality of heating chambers 16a, 16b and 16c which contain gas flames, for example. A vertical opening or passageway 17 is located at the bottom of 10b of heated chamber 10a. Passage 17 connects hollow heated chamber 10a and the top of muffle vessel 18.

Vessel 18 contains an open metallic pan or dish 19 which may be square, rectangular or circular in configuration being shown as the latter on the drawings. Dish 19 is fabricated of platinum, platinum-rhodium, or other high temperature alloy which may be heated to extremely high temperatures without damage or destruction. Dish 19 is positioned in a cavity in the top of support block 20 which serves to insulate dish 19 from the exterior of the apparatus.

A layer 21 of refractory-type cement such as "Insalute" is used to retain metal dish 19 within support block 20. An electrical heating element 22 having connecting terminals 23 is arranged within cementitious layer 21 surrounding the exterior of dish 19. With controlled amounts of electrical current supplied to electrical terminals 23, dish 19 may be heated to and maintained at regulatable elevated temperatures.

Muffle vessel 18 is movably supported within channel members 24 to move upwardly and downwardly as desired. In its lower position, dish 19 may be charged and recharged with volatilizable material 26 to be introduced into forming chamber 10. Muffle vessel 18 has counterweights 25 attached thereto by metal wires which operate over pulleys 28 to effect its vertical movement.

The upper portion of support block 20 is annularly tapered to closely fit into an oppositely tapered opening in the bottom of passageway 17. The lower portion 17a of passageway 17 is outwardly and downwardly flaring and terminates with approximately the same dimension and contour as the top of metal dish 19. The upper portion 17b of passageway 17 is of restricted dimensions to direct vapors from dish 19 upwardly into the initial glass forming area of mandrel 11.

Heated material 26 is vaporized to pass upwardly in measured amounts into a heated chamber 10a during the tube forming operation. Material 26 is placed in metallic dish 19 in its lowered position and the dish elevated into engagement with the tapered bottom portion of the vertical conduit. Material 26 may be composed of borax ($Na_2B_4O_7 \cdot 10H_2O$), kernite ($Na_2B_4O_7 \cdot 4H_2O$) or "Pyrobor" ($Na_2B_4O_7$). When material 26 is heated within dish 19 to a temperature of from about 1200° to 1575° C. by electrical elements 22, boron and sodium oxide are evolved in the vaporous state. The vapors are moved upwardly by convection and draft currents to create the boron and metal oxide containing atmosphere where molten glass contacts mandrel 11. Thus, the atmosphere is normally highly enriched or saturated with these components. Other materials such as salt (NaCl) or salt cake ($Na_2SO_4$) may be similarly volatilized to produce other desired components in the forming atmosphere to prevent their loss from the glass.

The lower portion 17a of muffle chamber 10 may be provided with a viewing port (not shown) which will permit viewing the volatilizable material 26 in dish 19 to determine when the supply thereof must be replenished. The dish 19 also may have one or more thermocouples installed therein to regulate volatilization of the selected material. The amounts of material 26 which are needed for the prescribed purposes are relatively small so that recharging of dish 19 is relatively infrequent. Thus, comparatively small amounts of material 26 may be employed during the formation of a considerable footage of glass rod or tube.

Various modifications may be resorted to within the spirit and scope of the appended claims.

I claim:

1. In glass tube drawing apparatus, a hollow chamber, means for heating said chamber, a downwardly-inclined rotary forming mandrel therein from which tube or rod is drawn, means for continuously flowing a stream of molten glass onto the mandrel, and means including an independently-heated receptacle and hollow passage joining said chamber and receptacle for introducing vaporized glass-forming material into said hollow chamber to control the atmosphere immediately surrounding said rotary mandrel and flowing stream of glass.

2. In glass tube drawing apparatus as defined in claim 1, said heated receptacle and hollow passage being located in approximately vertical alignment with the portion of said mandrel onto which the stream of glass is flowed.

3. In glass tube drawing apparatus as defined in claim 1, including electrical heating means located integral with said receptacle for vaporizing said glass-forming material contained therein from solid to vapor form.

4. In glass tube drawing apparatus as defined in claim 1, wherein said heated receptacle and hollow passage are in close fitting relationship.

5. Glass tube or rod drawing apparatus including a refractory-lined hollow chamber, means for heating said chamber, a frusto-conical shaped downwardly-inclined rotary forming mandrel mounted within said chamber from which the glass product is drawn, means for continuously flowing a stream of molten glass onto said rotary forming mandrel, a container mounted adjacent said chamber for retaining glass-forming constituents in solid form, means for independently heating said container to convert said glass-forming constituents to vaporous form, and a channel interconnecting said container and said chamber adapted to conduct said glass-forming constituents in vaporous form into said glass-forming chamber.

6. The method of producing drawn glass tubing or rod of borosilicate glass comprising the steps of rotating a downwardly-inclined forming mandrel in a heated chamber, delivering a stream of molten borosilicate glass onto said forming mandrel, drawing said glass from said forming mandrel having a prescribed cylindrical shape, and surrounding said molten glass and said forming mandrel with a boron and alkali-metal-containing atmosphere.

7. The method set forth in claim 6, including the step of vaporizing a boron and alkali-metal-containing material in an independently-heated source disposed adjacent and immediately below said hollow chamber and rotary mandrel, and delivering the said material in vapor form upwardly into said hollow chamber by convection to inhibit boron and alkali-metal loss from newly-formed molten glass surfaces.

8. The method set forth in claim 6, including the step of introducing a boron and alkali-metal-containing material in vaporous form into the area contiguous with the portion of said mandrel onto which the stream of glass is flowed to eliminate boron and alkali-metal loss from the molten glass as formed.

9. The method set forth in claim 7, including the step of controlling the amount of boron and alkali-metal material introduced in vaporous form by regulating the temperature of said independently-heated source, said material contacting and surrounding the surfaces of said molten glass during its formation.

10. The method of producing drawn glass tubing or rod of borosilicate glass comprising the steps of rotating a downwardly-inclined forming mandrel within a heated chamber, delivering a stream of molten borosilicate glass onto said rotating forming mandrel, drawing said glass from said forming mandrel having a prescribed cylindrical shape, and surrounding said molten glass and said forming mandrel with an atmosphere containing at least one glass-forming constituent of said borosilicate glass in vaporous form.

References Cited in the file of this patent

UNITED STATES PATENTS

| | | |
|---|---|---|
| 1,219,709 | Danner | Mar. 20, 1917 |
| 2,038,691 | Taylor | Apr. 28, 1936 |
| 2,065,852 | Dalton | Dec. 29, 1936 |
| 2,155,131 | Hanlein | Apr. 18, 1939 |
| 2,433,116 | Greenbowe et al. | Dec. 23, 1947 |
| 2,630,656 | Kramer et al. | Mar. 10, 1953 |

FOREIGN PATENTS

| | | |
|---|---|---|
| 849,843 | France | Dec. 2, 1939 |